United States Patent [19]

Lambke, Jr.

[11] 4,416,089
[45] Nov. 22, 1983

[54] DOOR AND WINDOW ARRANGEMENT

[75] Inventor: Bernard J. Lambke, Jr., Kenosha, Wis.

[73] Assignee: Dresser Industries, Inc., Dallas, Tex.

[21] Appl. No.: 252,516

[22] Filed: Apr. 9, 1981

[51] Int. Cl.³ .......................... B60J 5/04; E05D 15/22
[52] U.S. Cl. ................................. 49/502; 49/DIG. 1; 49/164; 49/168; 52/207; 52/400
[58] Field of Search ............... 49/502, 63, 450, 428, 49/DIG. 1, 163, 164, 168, 169, 506, 438; 52/207, 394, 400

[56] References Cited

U.S. PATENT DOCUMENTS

| | | | |
|---|---|---|---|
| 2,701,162 | 2/1955 | Kliger | 52/207 |
| 2,820,992 | 1/1958 | Clayton-Wright | 52/207 |
| 2,894,284 | 7/1959 | Howard | 52/207 |
| 2,914,121 | 11/1959 | Taylor | 49/168 X |
| 3,038,570 | 6/1962 | Etling | 49/438 |
| 3,107,939 | 10/1963 | Meyer | 52/400 X |
| 3,240,258 | 3/1966 | Blanco | 49/63 X |
| 3,338,015 | 8/1967 | Hoverman, Jr. | 52/400 |
| 4,344,257 | 8/1982 | Anderson | 49/DIG. 1 |

*Primary Examiner*—Philip C. Kannan
*Attorney, Agent, or Firm*—B. E. Deutsch

[57] ABSTRACT

A door and window arrangement for hingedly mounting in the opening of a cab frame wherein a door frame is formed complementary to and fitting within the opening and having a first frame extending inward. A subassembly is formed having an outer frame with a second flange extending toward and in close proximity to the first flange. A gimp engaging both flanges joins the door frame and subassembly into a completed assembly. An inner frame defining a pair of tracks is fastened to the inside of the inner frame. A fixed pane of glass is sealed into the lower portion of one track and a movable pane of glass is mounted in a metal frame with a plastic slider affixed to vertical members of the metal frame positioned within the other track.

4 Claims, 6 Drawing Figures

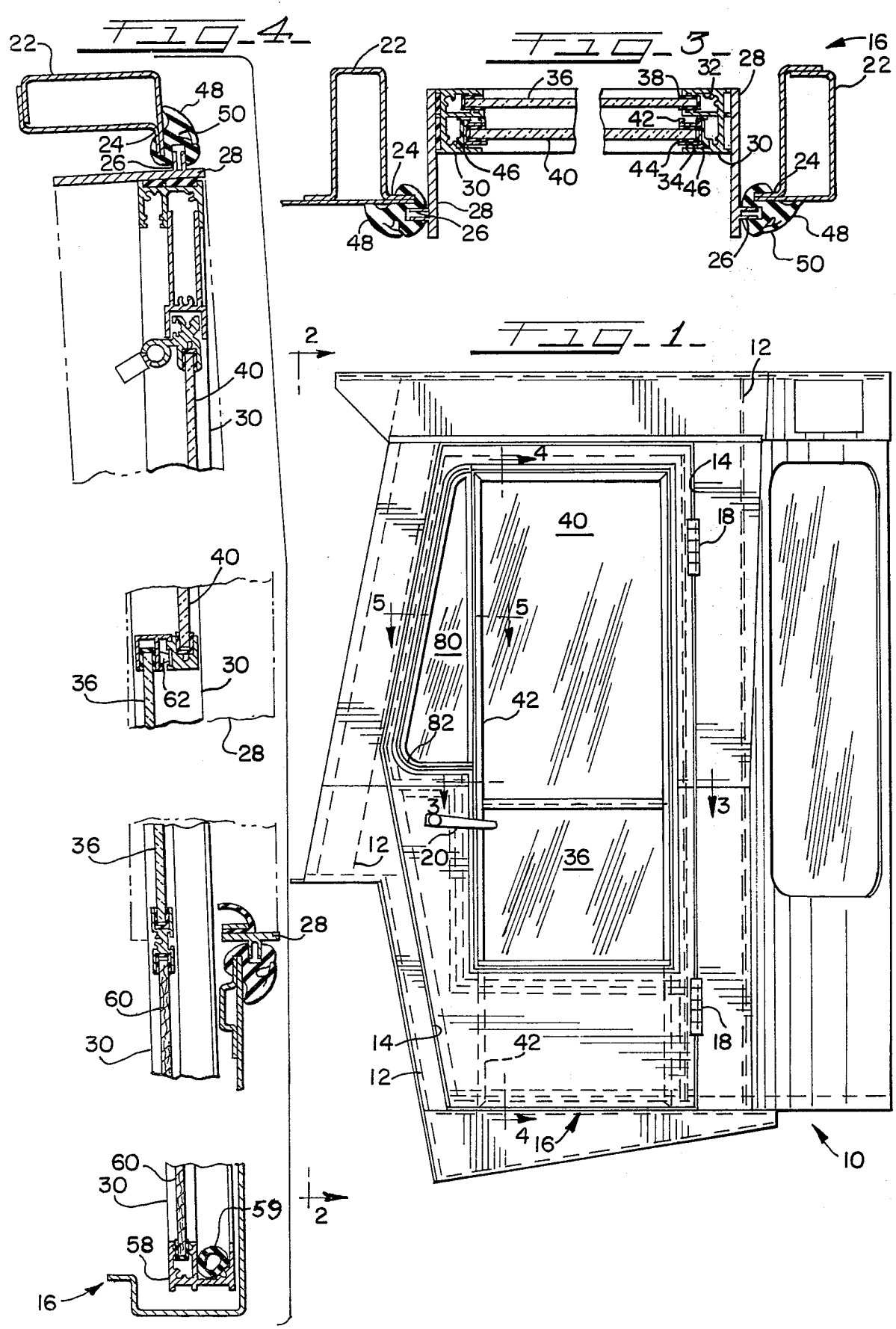

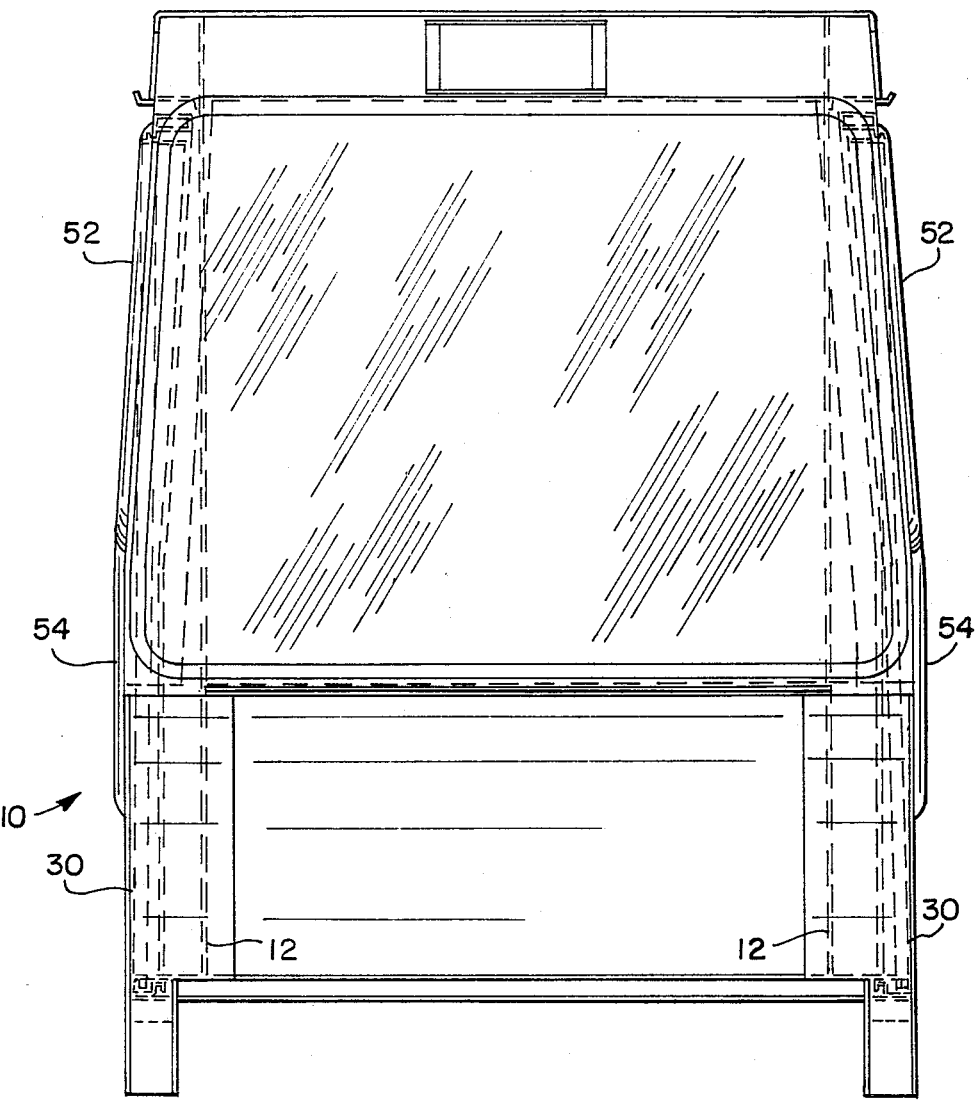
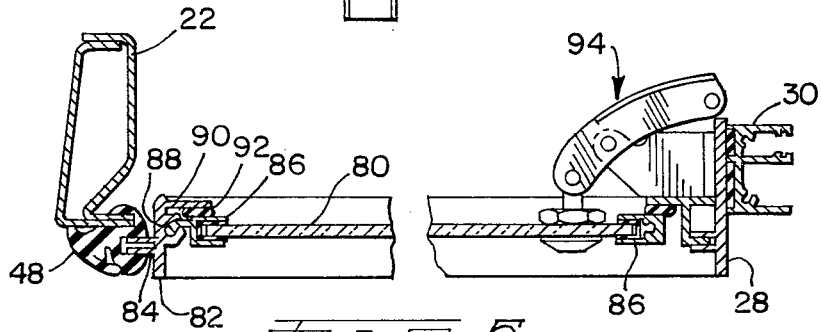
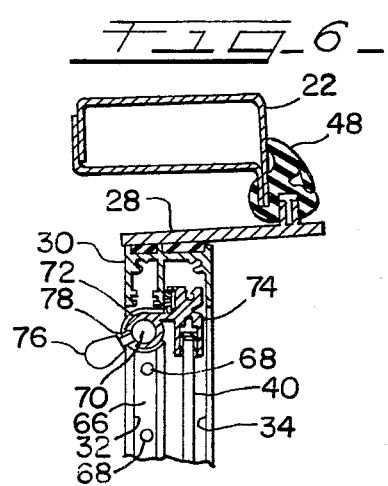

DOOR AND WINDOW ARRANGEMENT

BACKGROUND AND SUMMARY OF THE INVENTION

In construction equipment, such as an articulated, rubber-tired loader, ventilation of the cab is important. The environment in which such equipment operates is often dusty and the temperature frequently is quite high, higher than even ambient air temperatures because of the close proximity of the cab to heat sources, such as the engine, hydraulic reservoir, and hydraulic components. Outside air is therefore desirable and the operator's efficiency can often be enhanced when he may choose to have access to outside air even though that air is unfiltered or to improve the flow of air powered through a filter into the inside of the cab. In the past, one way to provide such access was by means of a door having a fixed window wherein the entire door can be latched in an open position. Alternatively, a dust door having a fixed window was provided that could be latched in an open position. One problem encountered with either of these arrangements was the hinges of the open door being stressed excessively because they were the major, and often the only, support for the door when latched open; the excessive stresses being generated by shock loads resulting from the equipment traversing rough terrain. In addition, either arrangement, but particularly the full door, was often undesirable because the size of the door was determined by the available size, contour and shape of the surface against which the door was latched. On articulated loaders clearance between the cab on one frame section and components on the opposite frame section was insufficient during extreme turns to permit the door to be latched in an open position. Even if such clearance is sufficient, damage to the door, the cab, or other loader components is likely should the latch device fail to hold the door securely in a fully open position.

Another form of prior art is the horizontally sliding window. While this arrangement provides selective variation of the area opened, such a window is inherently limited in the availability of area which can be opened to the outside air. The reason for this limitation is that the movable portion must remain within the confines of the door per se and hence must overlap a fixed pane of glass. Consequently, the maximum area capable of being opened to outside air is one-half the door width.

It is, therefore, an object of this invention to provide a door for construction equipment, particularly for articulated loaders, which does not have to be opened to provide access to outside air, which is capable of selective variation in area open to the outside, and which can withstand the stresses imposed thereon.

It is also an object of this invention to provide such a door which is adaptable to, and which will work with, cabs having a portion of that side mounting the door angled from the vertical.

It is a further object of this invention to provide such a door which permits convenient sub-assembly of certain portions thereof and which can readily be connected into a complete assembly prior to mounting the door on its hinges.

It is a still further object of this invention to provide such a door with a sub-assembly containing glass windows which can readily be mounted in a door frame assembly so as to effectively isolate the sub-assembly from some of the vibrations resulting from operation of the equipment.

These and other objects of the present invention will be more readily apparent upon a perusal of the following description of a preferred embodiment and the accompanying drawings, wherein:

FIG. 1 is a side elevational view of a cab incorporating a door and window arrangement according to the present invention;

FIG. 2 is a front elevational view of the cab of FIG. 1;

FIG. 3 is a cross-sectional view, with parts broken away, taken on line 3—3 of FIG. 1;

FIG. 4 is a cross-sectional view, with parts broken away, taken on line 4—4 of FIG. 1;

FIG. 5 is a cross-sectional view taken on line 5—5 of FIG. 1 showing the details of a wing vent; and FIG. 6 is a cross-sectional view similar to the top portion of FIG. 4 showing a window latching arrangement.

DESCRIPTION OF THE PREFERRED EMBODIMENT

Referring now to FIG. 1, there is shown a cab, indicated generally at 10, (the cab illustrated being intended for use on an articulated loader) having a cab frame 12 which, though covered with sheet metal, defines a door opening 14. A door 16 has an outline or silhouette which is complementary to the opening 14 and is hinged to the cab frame 12 by means of hinges 18. A door latch (not shown) controlled by handle 20 permits opening and latching of the door relative to the cab frame 12 in a conventional manner.

As best shown in FIGS. 2 and 3, the door 16 has a door frame 22 which may be constructed of formed sheet metal welded together to define a box cross-section, which inherently will provide high torsional and bending strength for the door 16 while being relatively light in weight. An inward projecting flange 24 is formed on the door frame 22 and overlaps, but is spaced apart from, a pair of outward projecting flanges 26 formed on an outer window frame 28. An inner window frame 30 is secured to the inside surface of the outer frame 28 and defines a pair of tracks 32 and 34. A fixed or non-movable pane of glass 36 is affixed to the lower portion of the inside track 32 by a seal member 38. A movable pane of glass 40 is held in a movable frame member 42 by a seal member 44. A slider member 46, formed of nylon or other plastic material having a low coefficient or friction, is affixed to the vertical portions of the framing member 42. The slider member 46 engages opposing sides of the outside track 34 and functions to smoothly guide the framing member 42 and the glass pane 40 as it is raised and lowered in the track 34. A gimp or rubber seal member 48 pressed onto the flanges 24 and 26 and thereafter locked with locking tab 50 serves both to hold the outer window frame 28, and all the members secured to or carried thereon, to the door frame 22 and to isolate those members from some of the vibrations transmitted to the door frame resulting from operation of the equipment. The arrangement with the gimp 48 permits the door frame 22 to be formed and welded together as a sub-assembly and the outer window frame 28 and its attachments to be built as a separate sub-assembly. The two sub-assemblies are then joined together by pressing the gimp 48 into position on the flanges 24 and 26. The overlapping of the flanges 24 and 26, with only a portion of the gimp 48 therebetween, provides sufficient rigidity to the assembly while permitting a limited amount of vibration isolation.

Referring now to FIGS. 2 and 4, it will be seen that the sides of the cab 10 may be provided with angled portions 52 which, though straight, angle inward from lower, essentially vertical portions 54. The edge (vertical side view) of door 16 will of course have to conform to the portions 52 and 54 in order for the door to properly fill the opening 14. However, the movable pane of glass 40 and its framing member 42 must be straigfht, i.e., without an inward angle, as well as the inner track in which they slide, in order for them to be lowered to the bottom of the door, as shown by the dotted line position of member 42 in FIG. 1. In order to accommodate this relationship, the inner frame 30 is angled relative to the outer frame 28 and extends below the outer frame 28, as shown in FIG. 4, terminating near the bottom of the door 16. The portion of the inner frame 30 extending below the outer frame 28 is not secured to the door but is merely suspended from its attachment to the vertical portions of the outer frame 28. In order to cushion the shock loads on this suspension, and to reduce possibility of glass damage, should the movable window be dropped onto the lower cross member 58 of the inner frame 30, a resilient tubular member 59 is positioned across the bottom of the track 34. In order to support the fixed pane 36 and to reduce heat transfer through the door, an insulation board 60 is affixed in the track 32 between the cross member 58 and the fixed pane 36. A brush seal 62 carried by the movable frame 46 provides a seal between the frames of the two panes when the movable pane is in a fully raised position.

The latching arrangement for adjustably securing the movable pane 40 is shown in FIG. 6. A strip of material 66, which may be plastic, for example, is secured in the vertical portion of the track 32. The strip 66 is provided with a plurality of spaced holes 68. Each hole 68 may be engaged by the undersized tip of a plunger 70 which is reciprocable within a tubular member 72. The tubular member is formed on and cantilevered from the upper cross member 74 of the frame 46 for the movable pane 40. The plunger 70 is spring biased toward the strip 66 so that the tip of the plunger is urged into engagement with the holes 68. A handle 76 affixed to the plunger 70 and extending through a slot 78 in the tubular member 72 permits manual retraction of the plunger 70 against the spring bias. The important feature is that the strip 66 be placed in the track 32 to control the positioning of the window movable in track 34. In this way the strip 66, the means fastening it to the inner frame 30 and any burrs from the holes 68 do not in any way interfere with the smooth raising and lowering of the movable pane 40. In addition, the operating handle 76 is moved inward toward the operator facilitating manipulation thereof. The strip 66, being positioned in the track 32 also serves to inhibit any tendancy of the fixed pane to move upward because the strip's position blocks the track in which the fixed pane is mounted.

A vent window 80, as best shown in FIG. 5, may be provided for even more flexibility and convenience in regulating flow of air through the cab. A second frame 82 of appropriate configuration is secured at its ends to the outer frame 28. Flanges 84 extending around the outer periphery of the second frame 82 permit mounting thereof to the frame 22 by the gimp 48 in the same manner as previously described. A vent frame 86 sealingly engages the periphery of the window pane 80 and is hinged at 88 to the second frame 82. A stop member 90 carrying a seal 92 is provided on both the inner side of the second frame 82 and the outer side of the outer frame 28. The vent frame 86 engages the seal 92 in its closed position. A conventional over-center latch 94 is secured between the window pane 80 and the outer side of the outer frame 28. Manipulation of the over-center latch 94 permits regulation of air through the cab without requiring recourse to the large movable window pane 40. Alternatively, the movable pane 40 and the vent pane 80 may be used in conjunction with each other.

It will be seen from the foregoing that the present invention fulfills all of the recited objects, thereby providing advantages both in the method of its manufacture and in its use and operation on cabs for construction equipment, particularly articulated loaders. While a preferred embodiment of the present invention has been disclosed herein, it will be appreciated that various changes and modifications may be made therein without departing from the spirit of the invention as defined by the scope of the appended claims.

What is claimed is:

1. A door and window arrangement comprising:
    a door frame having an inward projecting flange;
    an outer frame having an outward projecting flange overlapping said inward flange;
    a gimp pressed onto said flanges to hold said door frame and said outer frame together;
    an inner frame defining a pair of tracks secured to said outer frame;
    an insulating broad sealed into one of said tracks at its lower end;
    a fixed pane of glass secured to and resting upon said board;
    a movable pane of glass sealed to a movable frame;
    a slider member affixed to said movable frame and positioned in the other of said tracks; and
    means for adjustably positioning said movable pane relative to said inner frame.

2. The invention according to claim 1, wherein said last-mentioned means comprises:
    a strip of material provided with retainer means positioned in and secured to said one track;
    a latch means carried by said movable frame and engageable with said retainer means; and
    said strip positioned to inhibit upward movement of said fixed pane.

3. The invention according to claims 1 or 2, wherein a resilient tubular member is positioned across the bottom of said other track to decelerate said movable pane at the lower limit of its travel.

4. The invention according to claim 3, and further comprising:
    a second frame secured at its ends to the outer frame member;
    a wing frame;
    a wing pane of glass sealed in said wing frame;
    a hinge connecting said wing frame to said second frame; and
    an over center latch connected between said wing pane and said outer frame.

* * * * *

UNITED STATES PATENT AND TRADEMARK OFFICE
CERTIFICATE OF CORRECTION

PATENT NO. : 4,416,089

DATED : Nov. 22, 1983

INVENTOR(S) : Bernard J. Lambke, Jr.

It is certified that error appears in the above—identified patent and that said Letters Patent is hereby corrected as shown below:

In Claim 1 (column 4, line 35) it should read:
"an insulating board" instead of "an insulating broad".

Signed and Sealed this

Fourteenth Day of February 1984

[SEAL]

Attest:

Attesting Officer

GERALD J. MOSSINGHOFF

Commissioner of Patents and Trademarks